US012577965B2

(12) United States Patent
Bruck et al.

(10) Patent No.: US 12,577,965 B2
(45) Date of Patent: Mar. 17, 2026

(54) ELECTROMAGNETIC PILOT-OPERATED PROPORTIONAL PRESSURE CONTROL VALVE

(71) Applicant: HYDAC Fluidtechnik GmbH, Sulzbach (DE)

(72) Inventors: Peter Bruck, Althornbach (DE); Christian Groh, Gersheim (DE); Frank Schulz, Blieskastel-Bierbach (DE); Andre Jäger, Sangerhausen (DE); Lennard Günther, Dresden (DE); Jan Frederik Lübbert, Dresden (DE)

(73) Assignee: HYDAC FLUIDTECHNIK GMBH, Sulzbach/Laufen (DE)

( * ) Notice: Subject to any disclaimer, the term of this patent is extended or adjusted under 35 U.S.C. 154(b) by 0 days.

(21) Appl. No.: 18/843,627

(22) PCT Filed: Mar. 1, 2023

(86) PCT No.: PCT/EP2023/055214
§ 371 (c)(1),
(2) Date: Sep. 3, 2024

(87) PCT Pub. No.: WO2023/166075
PCT Pub. Date: Sep. 7, 2023

(65) Prior Publication Data
US 2025/0163941 A1     May 22, 2025

(30) Foreign Application Priority Data
Mar. 4, 2022     (DE) ..................... 10 2022 000 767.3

(51) Int. Cl.
*F16K 31/42*     (2006.01)
*F15B 13/043*     (2006.01)

(52) U.S. Cl.
CPC ........ *F15B 13/0433* (2013.01); *F16K 31/423* (2013.01); *F15B 2211/413* (2013.01);
(Continued)

(58) Field of Classification Search
CPC .................................................... F16K 31/423
See application file for complete search history.

(56) References Cited

U.S. PATENT DOCUMENTS

| | | | |
|---|---|---|---|
| 4,535,966 A | 8/1985 | Post et al. ........................ 251/31 |
| 6,886,802 B2 * | 5/2005 | Bartolacelli .......... F16K 31/408 |
| | | | 251/129.15 |

(Continued)

FOREIGN PATENT DOCUMENTS

| | | | |
|---|---|---|---|
| DE | 10323595 A1 | 12/2004 | |
| DE | 112006002306 T5 | 7/2008 | ............. G05D 16/20 |

(Continued)

OTHER PUBLICATIONS

Search Report for International Application No. PCT/EP2023/055214, 5 pages, May 19, 2023.

*Primary Examiner* — Umashankar Venkatesan

(74) *Attorney, Agent, or Firm* — Slayden Grubert Beard PLLC

(57) ABSTRACT

The disclosure relates to a valve, e.g., a proportional valve, comprising a main piston for actuating a main volumetric flow and a pilot piston for actuating a pilot volumetric flow. The main piston and the pilot piston are guided in a valve housing in a longitudinally movable manner, and the pilot piston can be actuated using a magnetic device. The position of the main piston can be set using the pilot piston which, based on the movement position thereof, signals the fluid pressure acting on the main piston into a pilot chamber via a fluidic connection or cuts of the fluid connection and connects the pilot chamber to a tank or low-pressure side via another fluidic connection into which a valve is introduced (Continued)

that closes in a leak-proof manner as soon as a fluidic connection is produced between the main piston and the pilot chamber.

17 Claims, 4 Drawing Sheets

(52) U.S. Cl.
    CPC ... *F15B 2211/428* (2013.01); *F15B 2211/455* (2013.01); *F15B 2211/46* (2013.01); *F15B 2211/50509* (2013.01); *F15B 2211/513* (2013.01); *F15B 2211/526* (2013.01); *F15B 2211/5756* (2013.01)

(56) References Cited

U.S. PATENT DOCUMENTS

| | | | | |
|---|---|---|---|---|
| 7,258,058 | B2 | 8/2007 | Smith et al. .................... | 91/454 |
| 7,921,880 | B2 * | 4/2011 | Jackson ............... | F16K 31/408 |
| | | | | 137/881 |
| 8,256,739 | B2 | 9/2012 | Pfaff ............................... | 251/29 |
| 9,777,844 | B2 * | 10/2017 | Bruck ................... | F16K 31/408 |
| 12,055,225 | B2 * | 8/2024 | Shimada ............. | F15B 13/0405 |
| 2006/0273270 | A1 | 12/2006 | Bill | |
| 2010/0294962 | A1 * | 11/2010 | Bill ....................... | F16K 31/408 |
| | | | | 251/30.01 |
| 2013/0255809 | A1 | 10/2013 | Bruck | |
| 2015/0184773 | A1 | 7/2015 | Hermann | |
| 2015/0323083 | A1 | 11/2015 | Bruck | |
| 2019/0011054 | A1 | 1/2019 | Knipper | |
| 2020/0011444 | A1 | 1/2020 | Morita et al. | |

FOREIGN PATENT DOCUMENTS

| | | | | |
|---|---|---|---|---|
| DE | 102009055802 A1 | 7/2010 | ............. | F15B 13/00 |
| DE | 102012006681 A1 | 10/2013 | | |
| DE | 102012014250 A1 | 1/2014 | ............ | F16K 37/00 |
| DE | 202015106864 U1 | 3/2017 | | |
| EP | 0083688 B1 | 7/1983 | ........... | F15B 13/043 |
| EP | 2880315 B1 | 9/2017 | | |

* cited by examiner

ELECTROMAGNETIC PILOT-OPERATED PROPORTIONAL PRESSURE CONTROL VALVE

CROSS-REFERENCE TO RELATED APPLICATIONS

This application claims priority to German Patent Application No. DE 10 2022 000 767.3, filed on Mar. 4, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a valve, in particular a proportional valve, comprising a main piston for actuating a main volumetric flow and a pilot piston for actuating a pilot volumetric flow, the main piston pilot piston being guided so as to be longitudinally movable in a valve housing and it being possible to actuate the pilot piston by means of a solenoid device.

DE 103 23 595 A1 discloses a valve, in particular in the form of a proportional poppet valve or gate valve, comprising a valve housing and at least three fluid ports passing through the valve housing as well as a main piston guided in the valve housing and a pilot piston which effects a pilot control and which can be actuated by means of a current-carrying solenoid device, whereby, when a pilot control is open, fluid passes from one of the two ports, which can be actuated by the main piston, via a cross-sectional restriction in the main piston and the pilot control to the third port, which can be actuated by the pilot piston, and whereby, due to the associated pressure drop, the main piston moves into a control position which can be actuated by the fluid quantity for each of the two fluid ports.

EP 2 880 315 B1 discloses a valve, in particular a pilot-operated proportional directional-control seat valve, comprising a valve housing which has a fluid inlet and a fluid outlet, it being possible to control the fluid flow between this inlet and outlet by means of a main piston, a pilot valve chamber being provided on a rear side of the main piston with a pilot valve closing member, which can be moved by an actuating device and with which the fluid flow between the pilot valve chamber and the fluid outlet can be controlled, an inlet orifice being arranged between the fluid inlet and the pilot valve chamber, it being possible to reduce the opening cross-section of the inlet orifice by means of a control element, the inlet orifice having a plurality of orifice holes, it being possible to reduce the opening cross-section of at least one of the orifice holes by means of the control element, and splitting of the inlet orifice into a plurality of orifice holes making it possible to switch the inlet orifice in a plurality of opening stages.

Such pilot-operated directional-control valves with electro-hydraulic actuation control the start, stop and direction of a volumetric flow as well as the speed, acceleration and deceleration of a hydraulic consumer connected to the valve, for example in the form of a hydraulic working cylinder. Pilot-operated directional-control valves are generally used where large volumetric flows are controlled with low flow losses. However, low flow losses at high volumetric flows mean large opening cross-sections and therefore large strokes of the main piston. Disturbances which impair the valve function are the flow and friction forces which counteract the switching movement and are dependent on the volumetric flow and differential pressure, i.e. the valve performance. Particularly in the case of mechanical actuation by a spring, usually in the form of a return spring, the rated value of the spring force may be too small compared to the frictional force for resetting the piston slide valve. To meet these demands on the solenoid system in terms of stroke and force, either the solenoid system would have to be dimensioned correspondingly large or the valve would have to be pilot-operated hydraulically. As shown above, valves are known in prior art for such applications, which therefore inevitably have a hydraulic pilot control.

SUMMARY

A need exists to provide an improved valve in terms of its functional behaviour.

The need is addressed by the subject matter of the independent claim(s). Embodiments of the invention are described in the dependent claims, the following description, and the drawings.

DESCRIPTION

Figure 1:
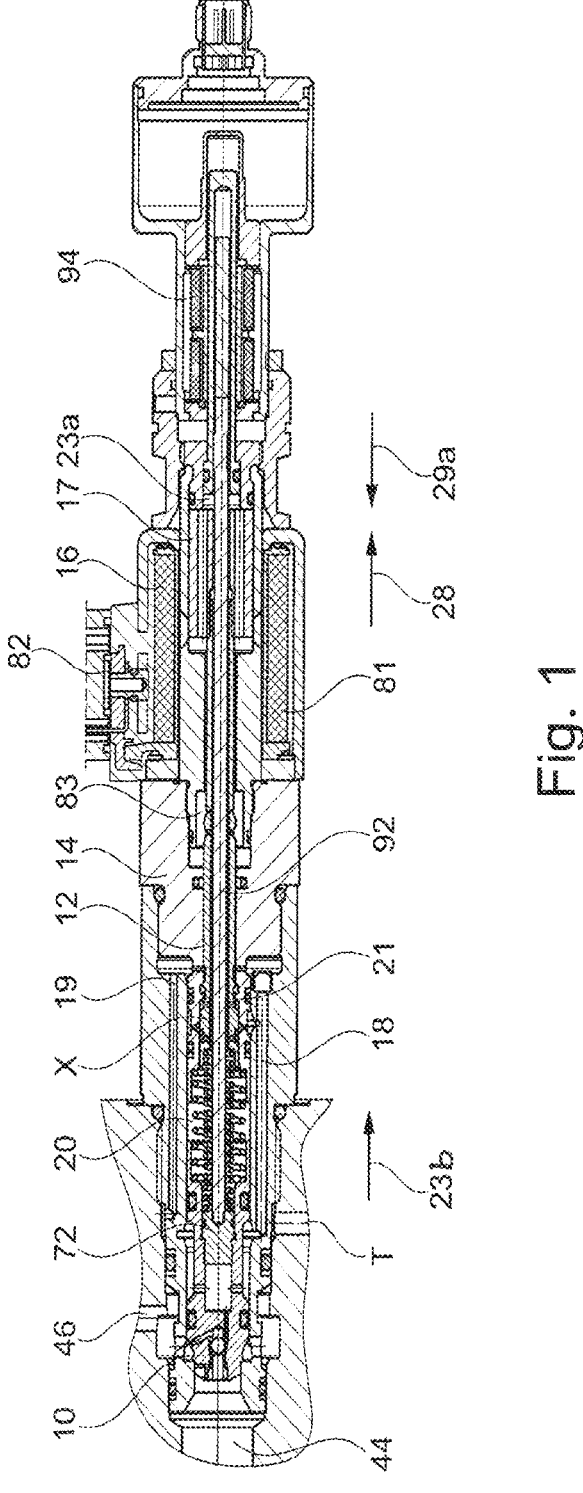
FIG. 1 shows example key components of an example valve, in the energised state.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to ordinary skill in the art that the invention may be one of practiced without these specific details. In other instances, well-known features have not been described in detail to avoid unnecessarily complicating the instant description.

In some embodiments, the position of the main piston can be actuated by means of the pilot piston which, depending on the travel position thereof, signals the fluid pressure acting on the main piston into a pilot chamber via a fluid connection or cuts off this fluid connection and connects the pilot chamber to a tank or low-pressure side via a further fluid connection into which a valve means is introduced which closes in a leak-proof manner as soon as the one fluid connection between the main piston and the pilot chamber is established. Accordingly, a pilot stage with the pilot piston in one of its possible operating or travel positions is sealed in a leak-tight manner inside the valve. Due to the said leak-proof seal for the pilot chamber with pilot piston, the valve can be used particularly beneficially as a so-called load valve, which maintains its predefinable, adjustable position leak-free even under high operational demands, thus ensuring that a load acting fluidically on the valve is not lowered unintentionally which can otherwise represent a considerable safety risk. In the closed position, the valve is leak-free and in the open position it carries a regulating volumetric flow.

In some embodiments of the valve, it is provided that the valve means is formed of a valve seat which is formed of sealing surfaces of outer circumferential parts of the pilot piston and inner circumferential parts of adjacent wall parts of the valve housing which can be brought into contact with one another. In particular, the contactable sealing surfaces can consist of sloping surfaces of different inclinations, so that a linear sealing contact or sealing edge is created between the pilot piston and the valve housing in the context of the valve seat to be produced, which is accompanied by increased sealing pressures and results in improved leak tightness.

In some embodiments of the valve, it is provided that the sealing surface of the pilot piston is located at a transition point between two different diameters of the pilot piston, of which the larger diameter defines an annular recess in the pilot piston and the smaller diameter in contrast is formed of an annular groove which, in the closed state of the valve seat, at least partially overlaps an annular recess in the valve housing from the inside. In this way, the aforementioned valve seat can be produced in a technically favourable manner.

In some embodiments of the valve, it is provided that a channel section engages in the one recess on the pilot piston and merges into the fluid-conducting channel of the pilot piston which opens into the pilot chamber on one side. In this way, the pilot chamber is connected to the movable components of the valve in a particularly flow-optimising manner.

In some embodiments of the valve, it is provided that, when the pilot piston is moved, with simultaneous prevention of the fluid connection from the main piston into the pilot chamber via the valve seat released in this manner, this releases a fluid guide via the one recess and the annular groove into a groove-like annular channel on the outer circumference of the pilot piston, into which the tank port of the tank side opens in a permanently fluid-conducting manner. In this case, it is for example provided that a guide section of the pilot piston, which is widened in diameter, is guided between the annular groove and the annular channel along the assignable inner circumferential parts of the valve housing in each travel position of the pilot piston. This achieves secure guidance of the pilot piston within the valve housing and a very compact design for the movable components within the said valve housing.

In some embodiments of the valve, it is provided that a dynamic seal is present at a predefinable distance from the closed valve seat towards the solenoid device on the side of the valve housing, which dynamic seal encompasses the outer circumference of the pilot piston with a predefinable pre-load. The dynamic seal achieves complete sealing of the pilot piston in the valve housing and leak-free sealing is achieved by means of the valve seat or by means of the dynamic seal in both directions, i.e. both towards the pilot chamber and also towards the solenoid device, which corresponds to the pilot pressure.

If annular relief grooves are for example introduced along the predefinable distance on the outer circumference of the pilot piston, it results in pressure-free and thus unobstructed operation of the pilot piston in the valve housing.

For example, it is provided that in the valve, a further valve seat is provided between the main piston and the valve housing as a further leak-proof means and that a third valve seat, formed by a closing ball and adjacent wall parts of the main piston, is provided as a third leak-proof valve means. In this way, the main stage of the valve, formed in particular by the main piston, is also executed to be leak-proof which is particularly beneficial if the valve is designed as a load valve. The various leak-proof valve means in conjunction with the dynamic seal ensure that no leakage volume flow can occur. The valve is designed to be pressure-closing, i.e., the valve closes automatically due to its basic design, which in turn makes it particularly suitable for use as a load valve. If a balance occurs between a spring force acting on the main piston and a magnetic force due to the actuating solenoid, the main piston of the valve remains in its predetermined regulating position and in this way controls the main volumetric flow between two fluid port points in the valve housing. For the aforementioned control behaviour, it is favorable that the pilot valve as a whole has a negative overlap and that a control edge is formed between the pilot piston and the valve housing by means of the first valve means, which control edge has a particularly fine regulating effect on the actuation operations for the main piston during operation of the valve.

The valve is discussed in greater detail below with reference to the drawings and further embodiments. Specific references to components, process steps, and other elements are not intended to be limiting. The drawings are not to scale.

The valve shown in the FIGS. is a so-called proportional valve and has a main piston 10 for controlling a main volumetric flow. Furthermore, a pilot spool 12 is present for controlling a pilot volumetric flow, the main piston 10 and the pilot piston 12 being guided together so as to be longitudinally movable in a valve housing 14. As can be seen in particular from FIG. 1, the pilot piston 12 is activated by means of a solenoid device 16 so as to be movable in the valve housing 14.

Figure 2:
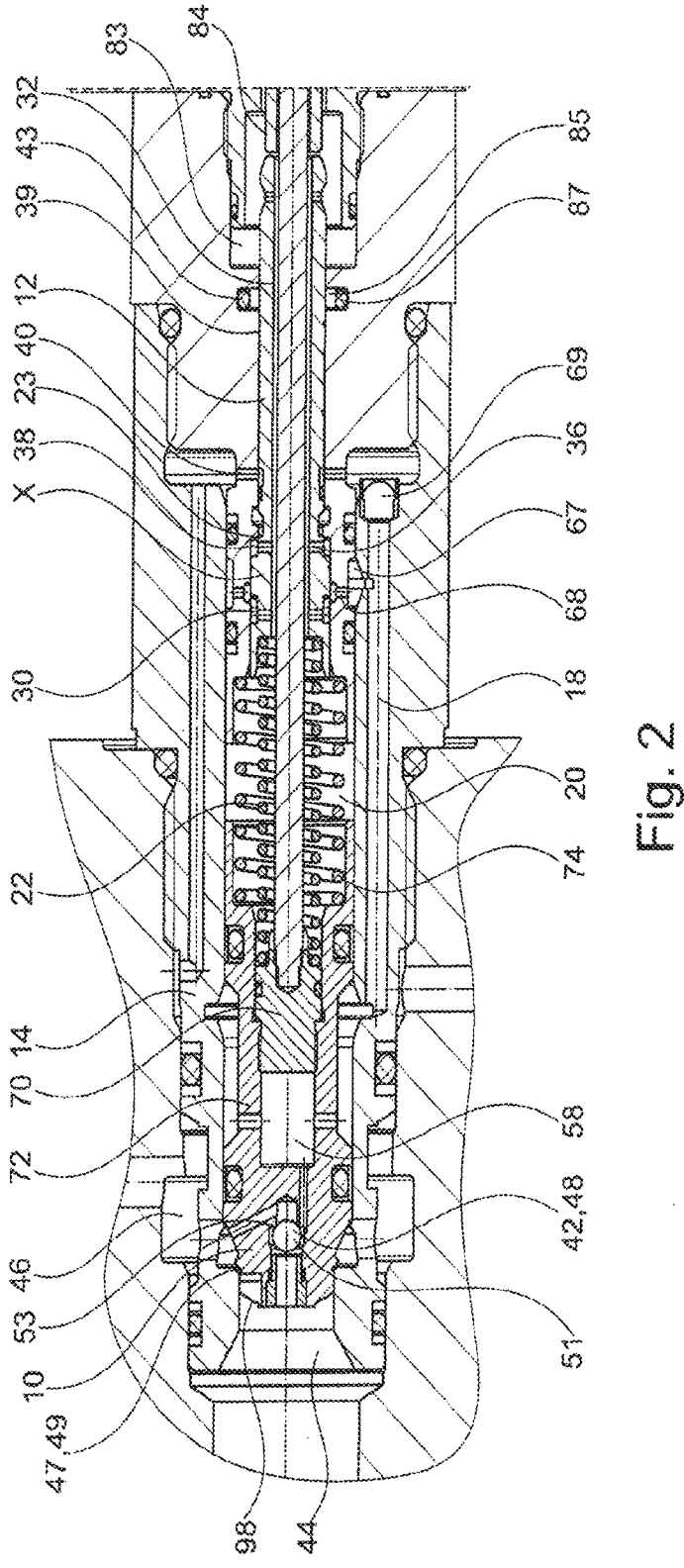
FIG. 2 shows a front part of the valve according to FIG. 1 in a closed valve position.
Figure 3:
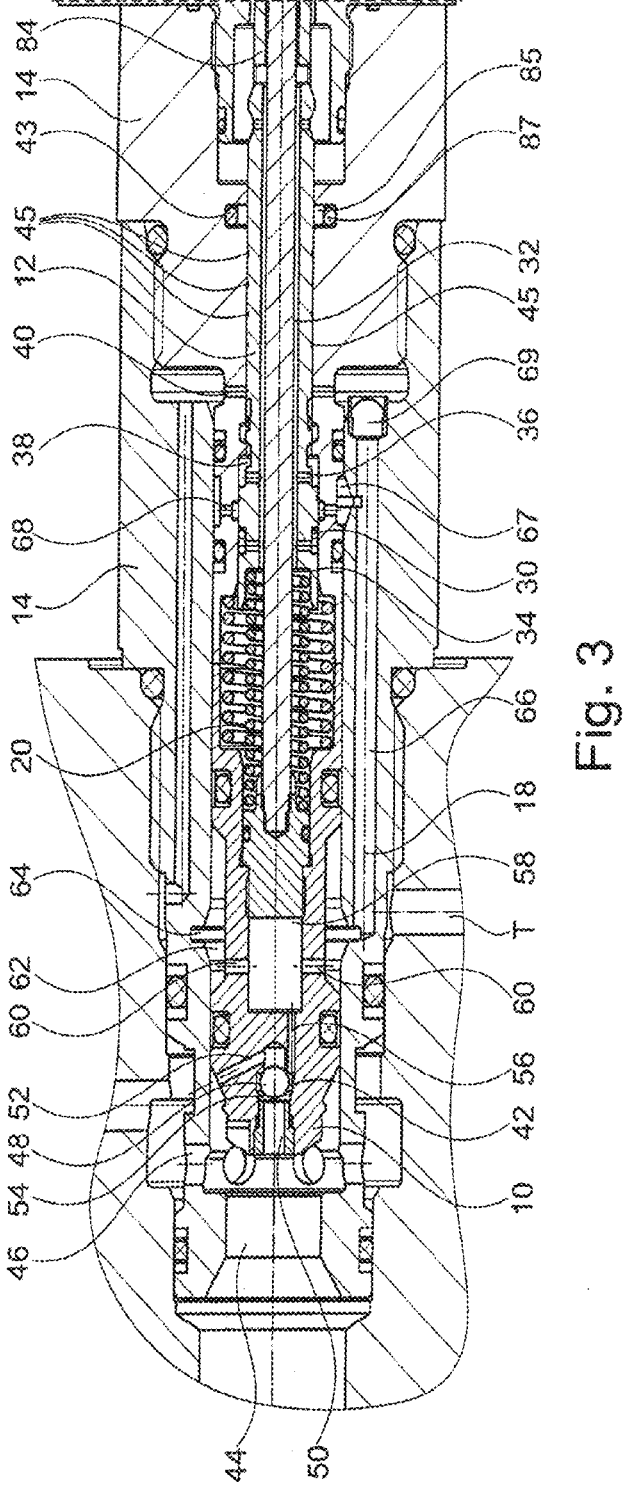
FIG. 3 shows an example diagram corresponding to FIG. 2 with the valve open.

The position of the main piston 10 can be adjusted by means of the pilot piston 12, by signalling a fluid pressure present at the main piston 10 via a fluid connection 18 into a pilot chamber 20 with the pilot piston 12, which holds the main piston 10 in its closed position preventing the main volumetric flow when the energised solenoid device 16 is actuated, as shown in FIG. 2, whereby, when the de-energised solenoid device 16 is not actuated, the pilot piston 12, starting from the energised actuating position shown in FIG. 2, moves to the left as viewed in the direction of the FIGS. into a starting position according to FIG. 3, in which the fluid pressure, substantially decoupled from the pressure supply via the main piston 10, drops in the pilot chamber 20 until the main piston 10 reaches an opening position regulating the main volumetric flow, as shown in FIG. 3 by way of example for one of the possible opening positions. If the directions "right" and "left" are mentioned, this means a direction viewed in the direction of the FIGS.

The position of the main piston 10 is accordingly adjusted with the aid of the pilot piston 12. In this respect, the balance of forces at the pilot piston 12 must be taken into account, which piston is guided in a virtually pressure-balanced manner except for any manufacturing tolerances, which is why there is no compressive force. This results in the following formula relationships:

$$F_{actuator} - F_{spring} - F_{friction} =$$

-continued $$F_{actuator} - (F1_{spring} + x * c) - F_{friction} = 0, \text{ where}$$

$$x = \frac{F_{actuator} - F1_{spring} - F_{friction}}{c} =$$

$$\frac{-F_{magnet} + F_{solenoid\ spring} - F1_{spring} - F_{friction}}{c}, \text{ where}$$

$$F_{actuator} = F_{solenoid\ spring} - f_{magnet},$$

wherein $F_{friction}$=induced frictional force due to the movement of the pilot piston 12, c=average spring stiffness of the springs used, $F_{spring}$=the force of the compression spring 22 acting on the end of the pilot piston 12, and $F_{solenoid\ spring}$=the compression spring 23a acting on an actuating solenoid 17, which acts towards the starting position of the pilot piston 12.

An additional compression spring (not shown) can act on the actuating solenoid 17 with its solenoid armature in the opposite direction of action to its pulling actuating direction, which serves to overcome the so-called dead current, i.e., to provide said current until the actuating solenoid 17 has overcome the spring forces as a whole and starts to move. In this way, any barriers in the operation of the valve can be prevented.

In the following, the individual forces which occur, in particular spring forces, are shown with their operating direction in FIG. 1 using force arrows. In this case, the spring force $F_{spring}$ acting on the end face of the pilot piston 12 is denoted by the arrow 23b, the magnetic force for the actuating solenoid 17 by the arrow 28 and the spring force $F_{solenoid\ spring}$ acting on the actuating solenoid 17 by the arrow 29a.

As can also be seen from the FIGS., the pilot piston 12 is configured as a hollow piston which has a first recess 30 on its outer circumference in the manner of an annular shoulder which, when the respective solenoid device 16 is actuated or energised, as shown in the diagram of FIG. 2, establishes a fluid-conducting connection 18 to the main piston 10 in an actuating position and, when the solenoid device 16 is kept de-energised, as shown in FIG. 3, moves into the starting position under the action of the compression spring 23a and interrupts the aforementioned fluid-conducting connection. The pilot piston 12 configured as a hollow piston has a fluid-conducting channel 32 along its inner circumference, which with its one free end opens out into the pilot chamber 20 via a radially extending channel section 36 of the axially extending channel 32 opening into a second annular recess 38 on the outer circumference of the hollow or pilot piston 12, which, when the solenoid device 16 is not actuated, as shown in the diagram of FIG. 3, reaches a fluid-conducting connection to a tank port 40 when the first recess 30 is disconnected from the fluid-conducting connection 18 to the main piston 10. All said fluid guides, such as the channel section 36 and the tank port 40, can be present multiple times as shown, only one fluid guide being routinely provided with a reference numeral for the sake of a simpler, clearer diagram. Moreover, in addition to the compression spring 23a, of which only the spring chamber between the solenoid armature 17 and fixed end housing parts of the valve housing 14 are shown for the sake of simplicity, further identically aligned energy accumulators, such as compression springs, can be used.

Connected in the fluid-conducting connection between the main piston 10 and the pilot chamber 20 is a leak-proof changeover valve 42 which forwards the higher pressure in each case from the two fluid ports 44, 46 in the valve housing 14, via which the main volumetric flow to be controlled is routed, into the pilot chamber 20 as a signal pressure when the valve is "energised" closed. If the fluid pressure at the end face, axial fluid port 44 is greater than at the radial fluid port 46 mounted at right angles to it, fluid with this higher pressure reaches the changeover valve 42 with its closing ball 48 via the fluid port 44 and a longitudinal channel 50 in the front region of the main piston 10, which is configured to be leak-proof. In this respect, the aforementioned closing ball 48 is moved to the right as viewed in the direction of the FIGS. and at the same time closes a sloping radial channel 52 introduced in the main piston 10 in a leak-proof manner, which channel opens into the fluid port 46 in the valve housing 14.

A further longitudinal channel 56, which is in turn introduced in the main piston 10 and which with its free face end opens into a fluid chamber 58 in the main piston 10, adjoins the valve chamber 54 of the changeover valve 42. The fluid chamber 58 is connected via at least two connecting channels 60 in the main piston 10, which are arranged at a right angle to the longitudinal axis of the valve, to a further fluid chamber 62 which, configured as an annular chamber, is arranged between the valve housing 14 and the main piston 10. Connecting thereto, the further fluid chamber 62 merges in a fluid-conducting manner into an annular chamber 64 arranged with a wider diameter in the valve housing 14, and from there a longitudinal channel route 66, configured as a high-pressure channel which is closed at the one free end by means of a plug 69, leads into a crescent-shaped annular space 67, which is introduced in an arched and fluid-conducting manner in a part of the lower segment of the valve housing 14.

Figure 4:
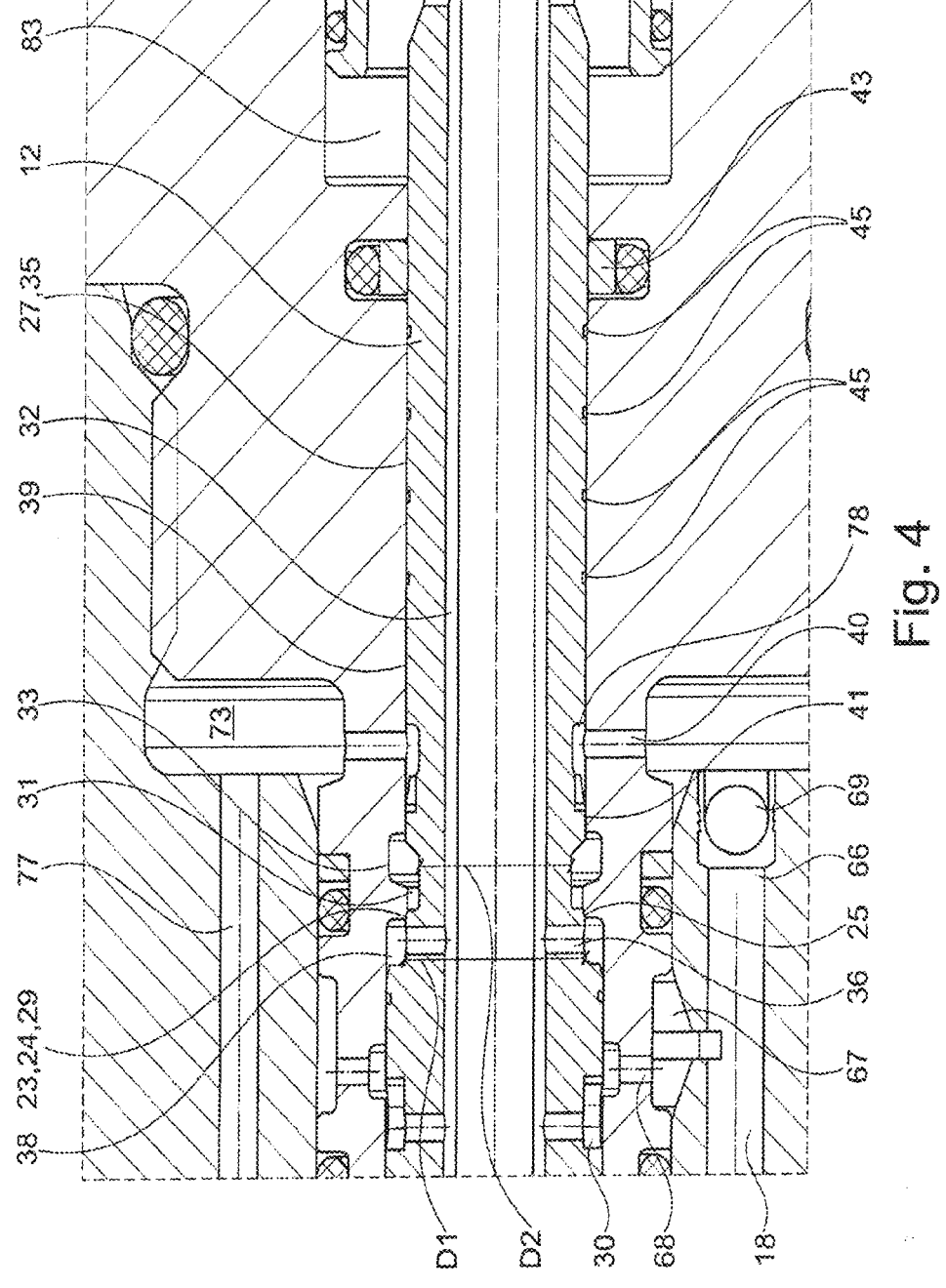
FIG. 4 shows an enlarged example diagram of a detail denoted by X in FIGS. 1 and 2.

As FIG. 4 in particular shows, the crescent-shaped annular chamber 67 merges in a permanently fluid-conducting manner into a radially arranged transverse channel part 68 in the valve housing 14 which at its inner free end towards the pilot piston 12 is widened in cross-section in a groove shape and which, according to the diagram in FIG. 2, comes into partial fluid overlap with the annular first recess 30 on the outer circumference of the pilot piston 12, the fluid-conducting connection in this respect being established as soon as the pilot piston 12, starting from its de-energised starting position according to FIG. 3 and moving from left to right when the solenoid device 16 is energised, reaches its right-hand actuating point according to FIGS. 1 and 2. In this respect, the valve is then in its closed position blocking the fluid path between the ports 44, 46.

It is understood that, as already explained, the respective channels and other connections, as shown, can be accommodated on the valve multiple times as required to ensure safe fluid guidance. In any case, the components 50, 52, 54, 56, 58, 60, 62, 64, 66, 67, 68 and 30 form the possible fluid connection 18 between the fluid ports 44, 46 on the main piston 10 and the pilot chamber 20 between the main piston 10 the pilot piston 12, provided that the solenoid device 16 is energised and assumes its right-hand actuating position according to FIGS. 1, 2 and 4. Otherwise, in the unactuated, normally open position of the solenoid device 16, the aforementioned fluid-conducting connection 18 between the first recess 30 and the transverse channel part 68 is prevented by the pilot piston 12 assuming its left-hand starting position in FIG. 3. In this respect, the respectively higher pressure at the fluid port 44 or 46 in the closed valve position of the main piston 10 is forwarded or signalled further to the pilot chamber 20, namely via the inner fluid-conducting channel 32 of the pilot piston 12, provided that the latter assumes its right-hand energised actuating position shown in FIGS. 1, 2 and 4. Otherwise, in the unactuated, de-energised position of the solenoid device 16, the aforementioned fluid-conducting connection 18 between the first recess 30 and the transverse channel part 68 is prevented by the pilot piston 12 assuming its left-hand starting position shown in FIG. 3. In this respect, the pressure in the pilot chamber 20 is switched via the tank port 40 and the further fluid-conducting connection 19 to the largely unpressurised tank side T so that the main piston 10 can assume one of its opening positions according to FIG. 3 in which a main fluid connection is established between the fluid ports 44 and 46 in both possible fluid directions, which will be explained in greater detail below.

If the pressure at the radial port 46, as the further fluid port in the valve housing 14, is greater than at the fluid port 44, the changeover valve 42 is switched, as viewed in the direction of the FIGS., by the closing ball 48 now assuming its left-hand closing position which closes the channel 50. In this way, fluid with predefinable pressure reaches the further longitudinal channel 56 via the fluid port 46 and the radial channel 52 as well as the valve chamber 54, so that in this respect the remaining fluid connection 18 to the pilot chamber 20 is now released via the route thereto when the pilot piston 12 assumes its energised, right-hand actuating position shown in FIG. 2. Typically, a fluid pressure originating from a pressure supply device, such as a hydraulic pump, should be present at the fluid port 44 and a hydraulic consumer, such as a hydraulic cylinder, should be connected to the fluid port 46. Other assignments of the fluid ports 44, 46 are conceivable in the context of using such proportional valves. Due to its leak-proof nature, the valve is particularly suitable as a so-called load valve with which loads can also be lowered in a controlled manner, particularly if the actuating solenoid device 16 cooperates in this way with an electronic open-loop or closed-loop control system.

As further emerges from the FIGS., the main piston 10 is composed of two components 70, 72, the aforementioned components 70, 72 with their free end faces directed towards each other defining the fluid chamber 58, viewed in the axial displacement direction of the valve pistons 10, 12. A second compression spring 74 engages as a further energy accumulator on the free end face of the second component 72, which is directed towards the solenoid device 16, said compression spring being supported with its other free end on stationary parts of the valve housing 14 and, designed as a compression spring, exerting a pre-load on the main piston 10 in the closing direction thereof. The compression spring 22 extends on the inner circumference of the second compression spring 74 and coaxial therewith, one free end of said compression spring being supported on a shoulder in the interior of the first component 70 and its other free end being supported on an annular protrusion on the pilot piston 12. In this way, both the main piston 10 and the pilot piston 12 are pre-loaded via the two compression springs 74 and 22 respectively with their respective spring force.

The following now describes how the movement of the main piston 10 is controlled. The movement of the main piston 10, viewed in the direction of FIG. 2, into a state as shown in FIG. 3, i.e. to the left, takes place as follows. The pressure present at the respective fluid port 44 or 46 upstream of the main piston 10, which is signalled to the pilot piston 12 via the changeover valve 42 and the fluid connection 18, initially holds the main piston 10 closed due to the pressure in the pilot chamber 20, as shown in the diagram of FIG. 2, via the surface difference formed by the opposing end faces of the main piston 10 when the solenoid device 16 is energised. In this case, in particular as shown according to the diagram in FIGS. 2 and 4, the pilot piston 12 is in leak-proof contact with the valve housing 14 via an annular valve seat 23, so that in this respect, when the valve is closed, there can be no unintentional leakage flow from the pilot chamber 20 towards the tank port 40.

If there is no force generated by the solenoid device 16 (normally open), the pilot piston 12 is moved to its left-hand starting position as shown in FIG. 3, taking into account at least the compression spring 23a which acts between the solenoid housing 14 and the actuating solenoid 17 of the solenoid device 16, viewed in the direction of the FIGS. In the aforementioned left-hand starting position, the recess 30 on the outer circumference of the pilot piston 12 is closed by associated housing parts of the valve housing 14 and disconnected from the high-pressure-conducting chamber 67. Similarly, the respective transverse channel 68, which can be connected to the fluid chamber 58 in a fluid-conducting manner and thus to the respective pressure introduction side on the main piston 10, is closed, for example in a fluid-tight manner, by the adjacent outer circumference of the pilot piston 12. Furthermore, the main piston 10 is held towards its closed position by the outer second compression spring 74.

However, the pilot chamber 20, which is correspondingly cut off from the pressure supply from the main piston 10, can now be kept depressurised towards the tank port 40 via the fluid-conducting channel 32 inside the pilot piston 12, in that the fluid pressure in the pilot chamber 20 inevitably decreases in this respect. In this way, a fluid connection is established from the pilot chamber 20 via the fluid-conducting channel 32 to the transverse channel section 36 of the aforementioned channel 32 extending in the opposite direction. As the pilot piston 20 is in its normally open starting position as shown in FIG. 3, the second recess 38 in the valve housing 14 is opened to the left, by means of the compression spring 23a acting on the pilot piston 12, and fluid can overflow from there towards the tank side via the released valve seat 23 and via the annular groove 31 into an annular recess 33 in the valve housing 14 into a relief space or a groove-like annular channel 78, which is formed by an axially widened annular recess in the valve housing 14. In this way, the pilot piston 12 takes the annular channel 78 mounted therein with it, so that the front end engages in the fluid-conducting annular recess 33, whereas the rear end of the annular channel 78 is still in the fluid guide with the respective tank port 40, at least with a reduced overlap. From this relief space or annular channel 78, when the valve seat 23 is released, the fluid thus under pressure from the pilot chamber 20 then flows out into the annular channel 78, which is recessed in the pilot piston 12 with a predefinable length in such a manner that the annular channel 78 is still at least partially in fluid-conducting alignment with the tank port 40 in every possible displacement position of the pilot piston 12. The fluid in the annular channel 78 is then transferred to the tank side T of the valve device via the respective tank port 40, so that in this respect the pilot chamber 20 is completely depressurised. Depending on the fluid pressure present in each case at the main piston 10, this is then opened against the spring action of the compression springs 22 and 74 and a new equilibrium is established at the open valve. In particular, the respective tank port 40 opens into an enlarged annular chamber 73 which establishes a fluid connection to the tank side T via a low-pressure-side connecting channel 77 which is guided through the valve housing 14 in the longitudinal direction.

If, on the other hand, the actuating solenoid 17 of the solenoid device 16 is energised again, the associated actuating solenoid 17 or solenoid armature moves to its right-hand displacement or stop position against the action of the solenoid spring 23*a*, viewed in the direction of FIG. 1. For this purpose, the solenoid device 16 has an energisable coil 81 which, appropriately energised, moves the actuating solenoid 17 or the solenoid armature from its starting position shown in FIG. 1 to the right into its actuating position. If the coil 81 is not energised via a conventional plug connection 82 on the solenoid device 16, at least the compression spring 23*a* permits an unobstructed return to the starting position shown, which corresponds to the position of the pilot piston 12 as shown in FIG. 3, i.e. "normally open".

In this starting position of the solenoid device 16, the pilot piston 12 is therefore also in its left-hand starting position, as shown in the diagram of FIG. 3, and as already explained, the pilot chamber 20 is accordingly no longer supplied with fluid of a predefinable pressure from the main piston 10. The fluid pressure prevailing in the pilot chamber 20 also acts basically on the rear of the main piston 10, so that the main piston 10 is securely held due to the surface ratio, provided that the pilot piston 12 assumes the position shown in FIG. 2. Accordingly, the actuating position or energised position corresponds to the securely closed position for the main piston 10. Furthermore, fluid reaches the rear thereof via the fluid-conducting channel 32 of the pilot piston 12, in order to establish pressure equalisation the movable components in this way; according to the diagram shown in FIGS. 2 and 4 alone, a leak-proof shutoff of the fluid path from the pilot chamber 20 towards the tank port 40 is now achieved via the valve seat 23, the shutoff of the fluid path being leak-tight in this direction.

The first valve means 21 formed of the valve seat 23 consists of sealing surfaces 24, 25 of outer circumferential parts 35 of the pilot piston 12 and inner circumferential parts 27 of adjacent wall parts of the valve housing 14 which can be brought into contact with one another, as can be seen in particular from the diagram in FIG. 4.

The sealing surface 24 of the pilot piston 12 is located at a transition point 29 between two different diameters D1, D2 of the pilot piston 12, of which the larger diameter D1 defines the annular recess 38 in the pilot piston 12 and the smaller diameter D2 in contrast is formed of the annular groove 31 which, in the closed state of the valve seat 23, at least partially overlaps the annular recess 33 in the valve housing 14 from the inside. For the closed position of the valve seat 23, the pilot piston 12 moves from its starting position according to FIG. 3 towards the right into the associated stop position with the valve housing 14 as shown in the diagram in FIGS. 2 and 4. In this way, the sealing surface 24 of the pilot piston 12 comes into contact with the associated inclined sealing surface 25 of the valve housing 14. To release the valve seat 23, i.e. to establish the fluid connection between the spaces 38, 31, 33 and 78, the pilot piston 12 moves in the opposite direction until it assumes a "normally open" position shown by way of example in FIG. 3.

As further emerges from FIG. 4, a guide section 41 of the pilot piston 12, which is widened in diameter, is present between the annular groove 31 and the annular channel 78, the guide section 41 being guided along the assignable inner circumferential parts 27 of the valve housing 14 in each of its travel positions. In this way, the solenoid device 16 is used to create a leak-proof and therefore fluid-tight seal in any case between the pilot chamber 20 and the rear region 83 of the valve via the closed valve seat 23.

As further emerges from the FIGS., a dynamic seal 43, which is stationary in the valve housing 14, is present at a predefinable distance from the closed valve seat 23 towards the solenoid device 16 on the side of the valve housing 14, which dynamic seal for example encompasses the outer circumference 39 of the pilot piston 12 with a predefinable pre-load. Since pressurised fluid at the main piston 10 can reach the other side with the solenoid device 16, i.e. the rear region 83, via the fluid channel 32 in the pilot piston 12, the pilot piston 12 is sealed by means of the dynamic seal 43, in particular with respect to the tank port 40 and therefore towards the tank side T. In this rear region 83, an actuating rod 84 of the solenoid device 16 engages in particular on the one free end face of the displaceable pilot piston 12 to actuate it.

The dynamic seal 43 for example consists of a mechanical seal 85, for example in the form of a segmented Teflon ring, which is held under pre-load by means of an elastomer O-sealing ring 87 and braces this mechanical seal 85 against the outer circumference 39 of the pilot piston 12 with a predefinable pre-load. The aforementioned dynamic seal 43 in the manner of a sliding seal is for example accommodated in an associated, groove-shaped recess in the valve housing 14 which, as the FIGS. show, can also be composed of multiple parts which is common in valve technology. The said gap between the annular recess 33 and the dynamic seal 43 is in any case smaller than four times the diameter of the pilot piston 12 in this region and larger than twice the diameter. In particular, the gap measurement should be 2.7 times the aforementioned diameter. The gap creates a kind of overlap between the transition to the annular recess 33 and the start of the dynamic seal 43. If the seal is not installed, the overlap is necessary to keep the leakage at a low level. In particular, individual annular relief grooves 45 are introduced into the outer circumference of the pilot piston 12 in this region to ensure unobstructed operation and to further improve the seal. Since, as already explained, a further valve seat 49 is created as a further leak-proof valve means 47 between the main piston 10 and the valve housing 14, and a third valve seat 53 is provided as a third leak-proof valve means 51, formed by the closing ball 48 together with adjacent wall parts of the main piston 10, a particularly beneficial load valve is created due to the three leak-proof valve means 21, 47 and 51 used which are disposed at different points.

Furthermore, the main piston 10 has, on its free, left-hand side, a convex end face 98 formed of a predefinable radius which serves to establish a linear relationship between the stroke of the main piston 10 and the opening surface it produces at the fluid ports 44 or 46. Otherwise, the main piston 10 is movably guided via stepped annular surfaces so as to be longitudinally movable on the inner circumference of the valve housing 14, a corresponding inclined surface forming the further valve seat 49 and in this respect resulting in the second leak-proof valve means 47. Overall, a leak-proof shutoff is achieved between the fluid ports 44, 46 in this way, provided that the main piston 10 assumes its closed position shown in FIGS. 1, 2 and 4. Individual sealing ring systems, not described in greater detail, regularly in the form of conventional O-sealing rings, ensure fluid-tight delimitation of the individual fluid spaces and fluid routes among one another, as indicated above.

As can be seen in particular from FIG. 1, a measuring rod 92 is fixedly arranged on the second component 72 of the main piston 10, which measuring rod extends through both the pilot piston 12 and the actuating solenoid system 16 in order to open out with its other free end region into a displacement measuring device, denoted as a whole by 94, which is provided with two measuring coils 96 so that the displacement movement for the main piston 10 can be measured in both directions.

A displacement measuring system of this type is described by way of example for a pressure compensator in DE 10 2012 014 250 A1.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A valve, comprising a main piston for actuating a main volumetric flow and a pilot piston for actuating a pilot volumetric flow, wherein the main piston and pilot piston are guided so as to be longitudinally movable in a valve housing and wherein the pilot piston can be actuated using a solenoid device, wherein the position of the main piston can be actuated using the pilot piston which, depending on the travel position thereof, signals the fluid pressure acting on the main piston into a pilot chamber via a fluid connection or cuts off this fluid connection and connects the pilot chamber to a tank or low-pressure side via a further fluid connection into which a valve device is introduced which closes in a leak-proof manner as soon as the one fluid connection between the main piston and the pilot chamber is established; wherein the valve device is formed of a valve seat which is formed of sealing surfaces of outer circumferential parts of the pilot piston and inner circumferential parts of adjacent wall parts of the valve housing which can be brought into contact with one another.

2. The valve of claim 1, wherein the sealing surface of the pilot piston is located at a transition point between two different diameters of the pilot piston, of which the larger diameter defines an annular recess in the pilot piston and the smaller diameter in contrast is formed of an annular groove which, in the closed state of the valve seat, at least partially engages over an annular recess in the valve housing from the inside.

3. The valve of claim 2, wherein a channel section engages in the one recess on the pilot piston and merges into the fluid-conducting channel of the pilot piston which opens out on one side into the pilot chamber.

4. The valve of claim 2, wherein when the pilot piston is moved, with simultaneous prevention of the fluid connection from the main piston into the pilot chamber via the valve seat released in this manner, a fluid guide is released via the one recess and the annular groove into a groove-like annular channel on the outer circumference of the pilot piston, into which the tank port of the tank side opens in a permanently fluid-conducting manner.

5. The valve of claim 2, wherein a guide section of the pilot piston, which is widened in diameter, is guided between the annular groove and the annular channel along the assignable inner circumferential parts of the valve housing in each travel position of the pilot piston.

6. The valve of claim 1, wherein a channel section engages in the one recess on the pilot piston and merges into the fluid-conducting channel of the pilot piston which opens out on one side into the pilot chamber.

7. The valve of claim 6, wherein when the pilot piston is moved, with simultaneous prevention of the fluid connection from the main piston into the pilot chamber via the valve seat released in this manner, a fluid guide is released via the one recess and the annular groove into a groove-like annular channel on the outer circumference of the pilot piston, into which the tank port of the tank side opens in a permanently fluid-conducting manner.

8. The valve of claim 6, wherein a guide section of the pilot piston, which is widened in diameter, is guided between the annular groove and the annular channel along the assignable inner circumferential parts of the valve housing in each travel position of the pilot piston.

9. The valve of claim 1, wherein when the pilot piston is moved, with simultaneous prevention of the fluid connection from the main piston into the pilot chamber via the valve seat released in this manner, a fluid guide is released via the one recess and the annular groove into a groove-like annular channel on the outer circumference of the pilot piston, into which the tank port of the tank side opens in a permanently fluid-conducting manner.

10. The valve of claim 1, wherein a guide section of the pilot piston, which is widened in diameter, is guided between the annular groove and the annular channel along the assignable inner circumferential parts of the valve housing in each travel position of the pilot piston.

11. The valve of claim 1, wherein a dynamic seal is present at a predefinable distance from the closed valve seat towards the solenoid device on the side of the valve housing, which dynamic seal encompasses the outer circumference of the pilot piston with a predefinable pre-load.

12. The valve of claim 1, wherein annular relief grooves are introduced along the predefinable distance on the outer circumference of the pilot piston.

13. The valve of claim 1, wherein a further valve seat is provided between the main piston and the valve housing as a further leak-proof valve device.

14. The valve of claim 1, wherein a third valve seat is provided as a third leak-proof valve device, formed by a closing ball and adjacent wall parts of the main piston.

15. The valve of claim 1, wherein the valve is a proportional valve.

16. A valve, comprising a main piston for actuating a main volumetric flow and a pilot piston for actuating a pilot volumetric flow, wherein the main piston and pilot piston are guided so as to be longitudinally movable in a valve housing and wherein the pilot piston can be actuated using a solenoid device, wherein the position of the main piston can be actuated using the pilot piston which, depending on the travel position thereof, signals the fluid pressure acting on the main piston into a pilot chamber via a fluid connection or cuts off this fluid connection and connects the pilot chamber to a tank or low-pressure side via a further fluid connection into which a valve device is introduced which closes in a leak-proof manner as soon as the one fluid connection between the main piston and the pilot chamber is established; wherein the sealing surface of the pilot piston is located at a transition point between two different diameters of the pilot piston, of which the larger diameter defines an annular recess in the pilot piston and the smaller diameter in contrast is formed of an annular groove which, in the closed state of the valve seat, at least partially engages over an annular recess in the valve housing from the inside.

17. A valve, comprising a main piston for actuating a main volumetric flow and a pilot piston for actuating a pilot volumetric flow, wherein the main piston and pilot piston are guided so as to be longitudinally movable in a valve housing and wherein the pilot piston can be actuated using a solenoid device, wherein the position of the main piston can be actuated using the pilot piston which, depending on the travel position thereof, signals the fluid pressure acting on the main piston into a pilot chamber via a fluid connection or cuts off this fluid connection and connects the pilot chamber to a tank or low-pressure side via a further fluid connection into which a valve device is introduced which closes in a leak-proof manner as soon as the one fluid connection between the main piston and the pilot chamber is established; wherein when the pilot piston is moved, with simultaneous prevention of the fluid connection from the main piston into the pilot chamber via the valve seat released in this manner, a fluid guide is released via the one recess and the annular groove into a groove-like annular channel on the outer circumference of the pilot piston, into which the tank port of the tank side opens in a permanently fluid-conducting manner.

* * * * *